(12) United States Patent
Bresselschmidt et al.

(10) Patent No.: US 9,717,324 B2
(45) Date of Patent: Aug. 1, 2017

(54) METHOD FOR PRODUCING A TOOTHBRUSH AND TOOTHBRUSH PRODUCED THEREBY

(71) Applicant: The Gillette Company, Boston, MA (US)

(72) Inventors: Andreas Bresselschmidt, Weiterstadt (DE); Andreas Birk, Kronberg/Taurus (DE); Holger Schulz, Frankfurt/Main (DE); Wolfgang Stegmann, Frankfurt/Main (DE); Jochen Ganninger, Eschborn (DE); Michael Jöst, Obertshausen (DE); Karl Herzog, Frankfurt/Main (DE); Andreas Reuschenbach, Bad Soden (DE)

(73) Assignee: THE GILLETTE COMPANY LLC, Boston, MA (US)

( * ) Notice: Subject to any disclaimer, the term of this patent is extended or adjusted under 35 U.S.C. 154(b) by 128 days.

(21) Appl. No.: 14/290,676

(22) Filed: May 29, 2014

(65) Prior Publication Data
US 2014/0352093 A1    Dec. 4, 2014

(30) Foreign Application Priority Data

May 29, 2013 (EP) .................................... 13169701
Sep. 5, 2013 (EP) .................................... 13183147

(51) Int. Cl.
*A46D 3/00* (2006.01)
*A46B 9/04* (2006.01)
(Continued)

(52) U.S. Cl.
CPC .................. *A46B 9/04* (2013.01); *A46D 3/00* (2013.01); *B29C 45/1657* (2013.01);
(Continued)

(58) Field of Classification Search
CPC .................................. A46D 3/00; A46D 3/005
(Continued)

(56) References Cited

U.S. PATENT DOCUMENTS 6,066,282 A * 5/2000 Kramer .................... A46D 3/00
15/167.1
6,968,590 B2 11/2005 Ponzini
(Continued)

FOREIGN PATENT DOCUMENTS

DE    8814824    *  6/1989 ........... A46B 5/0062
DE    8814824 U1    6/1989
(Continued)

OTHER PUBLICATIONS

International Search Report and written opinionmail date Aug. 7, 2014, 10 pages.

*Primary Examiner* — Laura C Guidotti (57) ABSTRACT

A method for producing a toothbrush comprises providing a head, a neck portion, and a handle; providing a coupling element; and combining the neck portion to the handle by the coupling element so that an irreversible connection is formed. The individual parts of the toothbrush to be formed can be produced in parallel or successively, wherein some of the parts can be produced by injection molding. A toothbrush formed by the method comprises a head, a neck portion, and a handle; these elements can be produced as building blocks separately and may be connected to one another via a coupling element to form an inseparable connection.

14 Claims, 6 Drawing Sheets

(51) Int. Cl.
*B29C 45/16* (2006.01)
*B29L 31/42* (2006.01)
*B29C 45/14* (2006.01)

(52) U.S. Cl.
CPC .... *B29C 45/1671* (2013.01); *B29C 45/14385* (2013.01); *B29C 45/1676* (2013.01); *B29L 2031/425* (2013.01)

(58) Field of Classification Search
USPC .......................................................... 300/21
See application file for complete search history.

(56) References Cited

U.S. PATENT DOCUMENTS

| 9,167,890 | B2* | 10/2015 | Hohlbein | A46B 15/0087 |
| 2009/0193603 | A1* | 8/2009 | Ponzini | B29C 45/14065 |
| | | | | 15/167.1 |
| 2013/0147254 | A1 | 6/2013 | Ponzini | |

FOREIGN PATENT DOCUMENTS

| DE | 102009021482 A1 | 11/2010 |
| EP | 602611 B2 | 9/1996 |

* cited by examiner

METHOD FOR PRODUCING A TOOTHBRUSH AND TOOTHBRUSH PRODUCED THEREBY

FIELD OF THE INVENTION

There is provided a method for producing a toothbrush, in particular a manual toothbrush. In addition, there is provided the toothbrush itself, which comprises at least a head, a neck portion and a handle, wherein the neck portion and the handle are connected to each other inseparably using a coupling element. Said toothbrush may be produced by the disclosed method.

BACKGROUND OF THE INVENTION

Manual toothbrushes are constructed as disposable articles. Latest after three month of use a manual toothbrush shall be replaced at least due to hygienic reasons. That means that consumer generally only expect a low pricing for manual toothbrushes. On the other hand, manual toothbrushes have to meet a lot of requirements, such as complex bristle fields in order to clean properly interdentally, the gum line as well as the back molar teeth. Further, a manual toothbrush has to be smooth to the gum and comfortable to handle. Thus, there is a continuous need for the manufacturer of manual toothbrushes to optimize production processes in order to work very cost effective. One problem of the manufacturing of manual toothbrushes is the production time. Speed reducing steps are the cooling times needed if injection molding is used and the complexity of the bristle fields. The latter requires a lot of successive steps, if anchor technology is used to fasten the bristle filaments to the brush head. In contrast, anchor-free bristling technologies further improve the complexity of the molding procedure which as a consequence increases the molding time.

Two different solutions to this problem have been offered mainly over the last years. The most pragmatic one is to offer low price and high price products wherein in low price products complexity of the whole brush, in particular the bristle field is reduced. However, usually the low price products show a worse cleaning.

Alternatively, it was disclosed to adapt the reuse system of electric toothbrushes which comprises a reusable handle and a disposable replacement brush head to the field of manual toothbrushes. Due to differences between manual and electric toothbrushes a direct adaptation of the system does not make any sense. For example, replacement brush heads of electric toothbrushes comprise the receiving cavity in the replacement brush head and the coupling element at the electric handle. However, the receiving element requires a large diameter of the neck portion. In addition, due to stability reasons the neck portions of replacement brush heads are made from very hard plastic material to impart a high rigidity and strength to the replacement brush head during use. This approach is impractical for manual brushes as the neck portion of manual brushes needs to be small and at least partially flexible for a comfortable and proper cleaning and handling.

EP1284618B1 shows manual toothbrushes comprising a replacement brush head wherein the coupling element is provided by the brush head and the receiving element is provided by the handle. Said manual toothbrush is reversible dividable between the neck and the handle and can be remounted by a snap-fit connection. The snap fit connection comprises flexible working portions and locating elements which engage into a receiving portion comprising a deformable elastic mass. However, these kind of snap-fit connections are difficult to produce and may wear out over time.

In addition, the split in dividable manual toothbrush may cause additional problems regarding hygienic use. Rests of paste, saliva and/or bacteria may enter the split or may stick to any edge, if the dividable portion is not sealed completely. EP0602611B1 offers another dividable manual brush comprising a swivel joint which is sealed by a pressure elastic material at the split portion. However, an elastic sealing of the split increases the complexity of the manufacturing process thereby increasing the production costs.

It seems that providing replaceable brush head for manual toothbrushes does not solve the initially discussed problem, but provides an alternative high price and complex product. Thus, there is still a need of providing high quality manual toothbrushes showing a high degree of complexity, quality and variability being produced by low costs.

SUMMARY OF THE INVENTION

In accordance with one aspect, there is provided a method of producing a manual toothbrush comprising a head having one or more cleaning elements having first ends intended to be mounted to the head, a handle and a neck portion being connected to the head and to the handle, comprising the steps of:
  providing a coupling element comprising a first end intended to be located in the neck portion and a second end intended to be located in the handle arranged opposite the first end;
  arranging the first end of the coupling element in a first injection molding cavity;
  providing one or more cleaning elements and arranging the first ends of the one or more cleaning elements in a first injection molding cavity;
  forming the head and the neck portion or a part thereof by injecting a first plastic material into the first injection molding cavity, wherein the first ends of the one or more cleaning elements and the first end of the coupling element are over-molded;
  providing a handle comprising a receiving element;
  forming the manual toothbrush by connecting the second end of the coupling element and the receiving element of the handle.

In accordance with one aspect, there is provided a toothbrush comprising a head comprising one or more cleaning elements, a handle and a neck portion being connected to the head using a coupling element, wherein the toothbrush is produced using the method disclosed herein.

BRIEF DESCRIPTION OF DRAWINGS

These and other features will become apparent not only from the claims but also from the following description and the drawings, with the aid of which example embodiments are explained below.

FIGS. 4 to 6 show alternative toothbrushes 10 produced by the method shown herein.

DETAILED DESCRIPTION OF THE INVENTION

The following is a description of numerous variants of a method of producing a toothbrush. Further, some example versions of a toothbrush are given, which can be produced with the method as disclosed herein. The description is to be construed as exemplary only and does not describe every possible embodiment since describing every possible embodiment would be impractical, if not impossible, and it will be understood that any feature, characteristic, structure, component, step or methodology described herein can be deleted, combined with or substituted for, in whole or in part, any other feature, characteristic, structure, component, product step or methodology described herein.

According to one aspect a method for producing a toothbrush, in particular a manual toothbrush, as described herein is described herein. In particular, a method is disclosed for producing a toothbrush comprising a head comprising one or more cleaning elements having first ends intended to be mounted to the head, a handle and a neck portion being connected to the head and to the handle. In particular, a toothbrush as described herein is achievable and producible by providing a coupling element at a coupling end of the neck portion, providing the handle comprising a receiving end and inseparably mounting the coupling element to the receiving end of the handle, whereby the neck portion and the handle are irreversibly connected to each other in order to form the toothbrush.

All different part of the toothbrush may be provided separately from each other or in groups. For example, the head and the neck portion may be provided together, but the handle and the coupling element may be provided separately. In addition or alternatively, all parts, namely the head or a part of it, the neck portion, the coupling element and the handle may be provided separately. Providing one or more parts of the toothbrush as described herein may be performed simultaneously or successively. For example, the coupling element may be produced in one manufacturing step and the head together with the neck portion and the handle are produced in parallel and all parts are connected to each other via the coupling element. If the neck portion and the coupling element are provided separately the coupling element is connected irreversibly to the coupling end of the neck portion. The irreversible connection between the coupling element and the neck portion may be performed simultaneously to, or before, or after the irreversible connection between the coupling element and the handle. In addition or alternatively, the neck portion and the coupling element may be produced together in one manufacturing step.

One method for producing a toothbrush as described herein comprises at least the following steps. In one step, the one or more cleaning elements are provided in order to include said one or more cleaning elements in a brush head to be formed. Thereby the first ends of the one or more cleaning elements are arranged in a first injection molding cavity.

Simultaneously or successively, a coupling element is provided, wherein the coupling element comprises a first end intended to be located in the neck portion and a second end intended to be located in the handle. The coupling element may be of any possible three dimensional shape and any possible coupling function. Then the first end of the coupling element is arranged in the same first injection molding cavity into the first ends of the one or more cleaning elements are arranged in. Due to this partial arrangement of the first ends of the one or more cleaning elements and the coupling element, the one or more cleaning elements and the coupling element will be partially over-molded by the plastic material to be injected into the first injection molding cavity. By injecting a first plastic material into said injection molding cavity the head and the neck portion of a toothbrush are formed thereby irreversibly connecting the one or more cleaning elements, the coupling element and the head together with the neck portion. As the one or more cleaning elements are over-molded at their ends to be mounted into a brush head the ends intended to clean the teeth protrude from the head formed. The coupling element is over-molded so much that a second end of the coupling element which is intended to couple to a second part of the toothbrush protrudes from the neck portion.

In parallel or successively to the method steps described above, a handle is provided which comprises a receiving element, wherein the receiving element is compatible to the second end of the coupling element which protrudes from the neck portion. Finally, the toothbrush is produced by connecting the coupling element of the neck portion and the receiving element of the handle, wherein said connection is inseparably so that the neck portion and the handle cannot be sub-divided again without destroying the toothbrush.

The irreversible mounting between the coupling element and the receiving element of the handle can be performed by any possible method. For example, the irreversible connection is formed by a snap and fit connection, by over-molding, welding, ultrasonic combination, gluing or any other mechanical connection which cannot be separated without destroying the neck portion and/or the handle.

Preferably the second end of the coupling element is over-molded during the injection-molding of the handle. Alternatively, the second end of the coupling element and the receiving end of the handle are combined by an irreversible snap and fit connection. In addition or alternatively, the second end of the coupling element and the receiving element of the handle are combined by gluing. The adhesives to glue the coupling element and the receiving element are chosen based on the plastics to be combined. In addition or alternatively, the surface of the second end of the coupling element and the surface of the receiving element of the handle are heated in order to melt the surface partially. After melting the surfaces the coupling element and the handle are combined chemically. However, a chemical connection might not be possible and/or secure enough by all material combinations.

In addition or alternatively, several connection techniques may also be combined. For example, direct manufacturing and/or mounting of the neck portion and/or the handle onto the coupling element may be combined with a later mounting of the remaining part of toothbrush. For example, after the neck portion is over-molded onto the coupling element the handle may be mounted to the coupling element later on using optionally additionally security elements, for example via a snap and fit connection.

A "coupling element" as understood herein shall mean any geometric body which is suitable to connect a neck portion and a handle irreversible to each other. For example, any pin, ball, hook, arm, plug, joint part, grappler or any other three dimensional protrusion from the neck portion can be used as coupling element. Generally, the outer shape of the coupling element is determined by the outer shape of the neck portion and the handle. Preferably, the outer shape of the coupling element corresponds mainly to the outer shape of the neck portion and/or the handle, but is less complex. That results in an easier manufacturing of the coupling element. In addition, the maximum extension of the coupling element is also determined by the maximum extension of the neck portion and the handle. Preferably, the extension of the coupling element is smaller than the extension of the neck portion and the handle so that the outer shape and design of the neck portion and the handle can be formed independently from the outer shape of the coupling element.

For example, the coupling element may be a cylindrically or conically shaped body comprising a first end protruding into the neck portion and a second end protruding into the handle after forming the resulting toothbrush. That means the coupling element protrudes from the neck portion. "Protrusion" from the neck portion as understood herein shall mean any significant deviation from the regular outline of the neck portion including the coupling end. Said coupling element comprises a diameter which may be smaller or identical to the diameter of the toothbrush at the connection between the neck portion and the handle. In addition or alternatively, the diameter of the coupling element may be constant or may decrease or increase towards the ends of the coupling element. If the diameter increases the connection can only be formed by forming the neck portion and/or the handle directly on the coupling element. The direct manufacturing and the increase in the diameter of the coupling element result to a very strong, connection between the neck portion and the handle. If the diameter decreases towards the first and/or second end of the coupling element or is constant, the coupling element, the neck portion and the handle may be manufactured separately from each other and may be connected later on. In order to form a stable inseparable and irreversible connection additional security elements may be provided by the coupling element and/or the receiving element. "Security elements" as understood herein shall mean any element which secures and interlocks the connection between the head/neck portion and the handle. Suitable security elements may be for examples, snap-fits, engagement hooks, protrusions, undercuts and or combinations thereof. All different variants may be also combined to each other. For example, the diameter of the coupling element may increase towards one end and decrease towards the other end or the diameter may increase or decrease towards one end and may be constant towards the other end.

The coupling element may comprise a circumferential elevation or collar. The "circumferential elevation" or collar as understood herein shall mean the central portion of the coupling element being located at the contact surface between the coupling end of the neck portion and the receiving end of the handle. The coupling end and the receiving end may show a common contact surface or a gap may be present between the ends which may be filled with the circumferential elevation or a sealing material. Said sealing material may be a hard plastic material, an elastomeric material, a resin or any other material suitable to seal. The circumferential elevation may be only the area of the contact surface or may be a bigger element having a thickness. The thickness of the circumferential elevation may be in the range of about 0.5 to about 5 mm, or in the range of about 0.5 to about 4 mm, or in the range of about 1 to about 3 mm, or in the range of about 1.5 to about 2.5 mm or any other numerical range which is narrower and which falls within such broader numerical range, as if such narrower numerical ranges were all expressly written herein. The circumferential elevation may be arranged perpendicular to the longitudinal axis of the brush or may be inclined to the longitudinal axis of the brush. For example the inclination angle to the longitudinal axis of the brush may be in the range of about 45° to about 85°, or in the range of about 55° to about 80°, or in the range of about 65° to about 75°, or any other numerical range which is narrower and which falls within such broader numerical range, as if such narrower numerical ranges were all expressly written herein.

The diameter of the circumferential elevation may be identical to the diameter of the coupling end of the neck portion and the receiving end of the handle. Alternatively, the diameter of the circumferential elevation may be smaller or bigger compared to the diameter of the coupling end of the neck portion and the receiving end of the handle. If these diameters are identical or the diameter of the circumferential elevation is bigger than the diameter of the neck portion and/or the handle the circumferential elevation of the coupling element is a visible element in the resulting toothbrush. Thereby the circumferential elevation may be used as a design element and/or as a functional element. For example, the circumferential elevation may inform the user about the brush properties or a bigger diameter of the circumferential elevation may be used to stop the fingers slipping in the direction of the head during the use of the toothbrush. If the diameter of the circumferential elevation is smaller than the diameter of the neck portion and the handle, the circumferential elevation will be covered by the material of the neck portion and/or the material of the handle. Alternatively, the circumferential elevation may be covered with an additional material in order to form a smooth and hygienic outer surface of the toothbrush. An internal, i.e. non-visible circumferential elevation which is covered with the neck, handle and/or additional material may be used as an internal stabilizer against torsion or bending. The diameter of the coupling element may decrease rapidly or continuously towards the ends of the coupling element after the circumferential elevation. Alternatively, the diameter of the coupling element may decrease rapidly or continuously towards the ends of the coupling element including the area of the circumferential elevation. For example, the circumferential elevation may comprise a constant diameter, then the diameter may decrease rapidly and the remaining part of the coupling element may comprise a constant and/or a decreasing or increasing diameter.

The coupling element may be provided using injection molding, thus any material suitable to be processed by injection molding may be used to produce the coupling element. For example the coupling element may consist of a hard plastic material. Said hard plastic material may be a pure hard plastic material or a mixture of several hard plastic materials. Suitable hard plastic materials are for example, polyoxymethylene, polypropylene, polyethylene, polyethylene terephthalate or mixtures thereof. Producing the coupling element from a hard plastic material stabilizes the toothbrush in the most bent middle section. Thereby also expensive materials can be used as only the small coupling element has to be formed from the expensive material. The handle, head and the neck portion can be produced for example from a less expensive material. For example, the handle, head and the neck portion can be produced from polypropylene showing for example anti-adhesive properties with respect to any kind of dirt.

In addition or alternatively, the material of the coupling element may comprise a higher E-modulus than the material of the head and/or the material of the handle. If the coupling element is made from a material comprising a higher E-modulus than the material of the head and/or the handle the coupling element may show a further functionality, namely the coupling element may be used as a hinge. In particular, a thicker circumferential elevation may allow the brush to be bent in the middle of the brush. The thickness of the thicker circumferential elevation which shall provide a hinge function may be in the range of about 2 to about 20 mm, or in the range of about 5 to about 15 mm, or in the range of about 8 to about 13 mm, or in the range of about 10 to about 12 mm or any other numerical range which is narrower and which falls within such broader numerical range, as if such narrower numerical ranges were all expressly written herein. Thereby high pressure which is placed onto the teeth during use of the toothbrush may be compensated by the hinge function of the coupling element. Suitable materials which can be used for a coupling element showing an additional hinge function may be for example polypropylene, polyethylene, a thermoplastic elastomer or a mixture thereof. Thermoplastic elastomers which may be used to form the coupling element may show a Shore A hardness in the range of about 60 to about 110, or in the range of about 70 to about 100 or in the range of about 75 to about 90 or any other numerical range which is narrower and which falls within such broader numerical range, as if such narrower numerical ranges were all expressly written herein.

In addition or alternatively, the hinge function of the coupling element may be realized by a special combination of the materials of the handle and of the coupling element. For example, the coupling element may be formed form a hard plastic material and the handle of the toothbrush may be formed from a soft plastic material at least in the area of the coupling element. A force applied to the one or more cleaning elements may be transported via the coupling element into the elastomeric part of the handle. Thereby the elastomeric part of the handle is compressed. Said compression compensates the force applied at least partially. Said partial compensation of the force applied to the one or more cleaning elements will be helpful, if the user applies too much force during brushing. Brushing using too much force may hurt the gums as well as the teeth, so that it may be advantageous having a brush providing a compensation mechanism. The hardness of the elastomeric material of the handle may be adapted to the force applied which is critical for the gums and the teeth so that the compensation of the force only works with critical forces and the non-critical forces can be used completely for the brushing action.

The handle of the toothbrush comprises a receiving end comprising a receiving element which is suitable to receive the coupling element. That means that form and function of the receiving element are determined by form and function of the coupling element. For example, if the coupling element is a kind of a pin, the receiving element comprises at least a hollow space which is compatible to the coupling pin. In addition or alternatively, if the coupling element comprises a mechanical snapping element, the receiving element comprises the corresponding counterpart. Independently from the concrete design of the coupling element and the receiving element the connection of the coupling element and the receiving element is irreversible. That means after one neck portion is mounted via the coupling element to one handle, these parts of a toothbrush are mounted inseparably to each other.

In addition or alternatively, the receiving element may be an integral part of the handle or it may be a distinguishable part which is irreversibly connected to the handle. If the receiving element is an integral part of the handle, receiving element and handle consist of the same material. Example materials are given together with the description of the handle variants. If the receiving element is a distinguishable part, it may consist of the same or a different material than the handle. The material of the receiving element may be for example a hard plastic material or a soft plastic material. Suitable hard plastic materials are for example polyoxymethylene, polypropylene, polyethylene, polyethylene terephthalate or mixtures thereof. Soft plastic materials are for example a thermoplastic elastomer, in particular a thermoplastic elastomer having a Shore A hardness in the range of about 30 to about 90, or in the range of about 40 to about 80, or in the range of about 50 to about 70 or any other numerical range which is narrower and which falls within such broader numerical range, as if such narrower numerical ranges were all expressly written herein. Preferably, the material of the handle and the material of the receiving element are combined in that a chemical and/or molecular connection is formed between the two materials.

The handle may be of any shape suitable to be hold by the user. Geometric shape may be adapted to the user preferences according to cleaning behavior and toothbrush handling. The easiest shape of a handle may be an elongated pin. Said shape may be optimized according to curve and thickness. The handle may be produced from any material. For example the handle may be formed from plastic, metal, ceramic, glass, wood, such as bamboo, horn, ebonite etc. Suitable plastic materials are for example polyoxymethylene, polypropylene, polyethylene, polyethylene terephthalate, soft plastic materials or mixtures thereof. If the handle is manufactured from plastic, the handle may be produced by blow molding, injection molding or any other molding method. If the handle is produced by injection-molding the coupling element and the handle may be produced in parallel. Thereby, the same or a different material may be injected into the separate mold cavities.

The surface of the handle may be further finished, for example by galvanization, polishing or roughening, applying a coating, a printing, a varnish or a combination thereof. In addition or alternatively, the handle may comprise elastomeric elements at the outline which may be used as design elements in order to improve the optical appearance of the handle and/or may be used as functional elements improving for example the haptic of the handle. The functional elements may improve the overall haptic of the handle or may provide grapping areas for the fingers.

In addition to providing the gripping area for handling the toothbrush, the handle may provide more functional properties. For example, the handle may compensate pressure applied to the teeth. If the user applies more than a critical pressure to toothbrush during brushing the gum, the gum lines or the teeth may be hurt by the cleaning elements. Said pressure may be partially compensated by the handle. For example, if the handle comprises an elastomeric part, the toothbrush may be bent elastically. For example, the part of the handle surrounding the coupling element may comprise or consist of a thermoplastic elastomer. Thereby, the coupling element can be pressed into the elastomeric material and the pressure is compensated partially.

For the toothbrush as described herein any known cleaning elements may be used. Suitable cleaning elements are for example bristles, bristle tufts, elastomeric elements or combinations thereof. Bristles may be for example monofilaments made from plastic material. Suitable plastic material used for bristles may be polyamide (PA), polybutylterephthalate (PBT), polyethylterephthalate (PET) or mixtures thereof. Several bristles may be combined to form one bristle tuft. Suitable numbers of bristles to form one bristle tuft may be for example in the range of about 10 to about 80, or in the range of about 15 to about 60, or in the range of about 20 to about 50, or in the range of about 25 to about 40, or any other numerical range which is narrower and which falls within such broader numerical range, as if such narrower numerical ranges were all expressly written herein. Two or more bristle tufts may be combined in order to form one super tuft. One bristle tuft may consist of identical filaments or filaments of different material, different form, different length, different diameter, different end geometry or any other filament property. The filaments of one tuft may differ in more than one property. Several bristle tufts may be arranged in the head to form the cleaning elements.

In addition or alternatively, bristles or bristle tufts may be combined with elastomeric elements to form the cleaning elements. The elastomeric element may be, for example, a nub, a pin, a fin, a wall, a bar, a gutter, a curve, a circle, a textured element, a polishing element such as, for example, polishing cups or a tongue cleaning element or a combination thereof. Natural rubber, synthetic rubber, thermoplastic elastomers or a mixture thereof may be used as an elastomeric material to form the elastomeric elements. A "textured element" as used herein, refers to a structure that has a macroscopic surface texture. For example, the textured element may be composed of a cluster of ribs, fins, columns, or other protrusions, or a combination of ribs, fins, columns, or other protrusions, that together form a unitary structure. In addition or alternatively, the texture can be imparted to the member by a manufacturing process such as injection molding, by embedding particles in the surface of the member, or by selecting a material for the member that inherently has a surface texture, e.g. open cell foam.

The cleaning elements are fastened to the head by over-molding. The method step of providing the one or more cleaning elements may comprise arranging the one or more cleaning elements in holes of a mold bar so much that the ends of the one or more cleaning elements are arranged outside of said mold bar. Said mold bars have to resist the molding temperatures and should cover the free ends of the one or more cleaning elements against the melted material during the molding process. Mold bars may be formed from any material meeting these requirements, such as for example steel or high melting plastics. The holes in the mold bar are arranged in that the one or more cleaning elements are arranged therein according to the arrangement of the one or more cleaning elements in the resulting brush head. All kind of cleaning elements can be arranged in the holes of a mold bar. Preferably filament tufts, elastomeric elements, combinations thereof and/or mixtures thereof may be arranged in the holes of a mold bar.

After arranging the one or more cleaning elements in the holes of the mold bar the cleaning elements having more than one end protruding from one hole, such as e.g. filament tufts, are fused by melting the ends. In addition or alternatively, elastomeric material may be injected in at least one of the holes provided by the mold bar. Thereby elastomeric cleaning elements are produced directly in the mold bar and are mounted later on to the brush head by over-molding. If elastomeric elements are formed by injection-molding into the mold bar, the holes show the outer surface of the elastomeric elements.

Thereby, the cleaning elements may be mounted directly to the head or the cleaning elements may be mounted to a separate cleaning element carrier in a separate step. For example, the cleaning elements may be mounted to plate in a pre-molding step. Therefore, the ends of the one or more cleaning elements which are intended to be mounted into the brush head may be over-molded by a second plastic material. Thereby a thin plate is formed which covers the one or more cleaning elements and avoids that the first plastic material forming the head enters into the holes. Said second plastic material may by identical or different to the first plastic material used for molding the head and the neck portion. In addition or alternatively, the second plastic material may also be used to form one or more of the one or more cleaning elements. Doing this, at least one of the holes of the mold bar is filled with the second plastic material thereby forming at least one cleaning element. The pre-molded plate carrying the cleaning elements is then introduced into the first injection molding cavity into which the head and the neck portion are formed.

The head may comprise any form suitable to be introduced into a mouth in order to clean the teeth. Suitable materials for the head may be hard or soft plastic materials, for example polyoxymethylene, polypropylene, polyethylene, polyethylene terephthalate, thermoplastic elastomers or mixtures thereof. In addition, plastic materials of different Shore A hardness may be combined. In addition to the cleaning elements, the head may comprise a tongue cleaner or any other oral cleaning implement.

The neck portion connects the head and the handle and comprises the coupling element. Head and neck portion may be one integral part. The neck portion may consist of the same material than the head. The neck portion may be of any geometric shape as long as its function of providing the coupling element persists. The surface of the head and/or the neck portion may be further finished, for example by galvanization, polishing or roughening, applying a coating, a printing, a varnish or a combination thereof.

The separate manufacturing of the individual parts of a toothbrush results in high flexibility of the manufacturing process. That means different toothbrush elements can be produced first and combined later on to form individually designed toothbrushes. For example, several handle variants can be produced which can be mounted to neck portions comprising several brush heads providing, e.g. different cleaning element fields. Alternatively, different handles can be combined with other oral care implements, such as for interdental brushes, toothpickers, floss holders, tongue cleaners or oral cavity mirrors. Producing a toothbrush by combining several parts may be advantageous regarding the flexibility and the production time. Thus, the toothbrush as described herein may be described as a toothbrush system which is highly flexible.

In addition, the manufacturing of a toothbrush as disclosed herein is very time and cost effective. Due to the combination of the different parts, all individual parts are smaller and shorter, so that the dimension of the molds is smaller. Therefore more cavities can be combined in on molding machine or the molding machines are smaller. In addition, the cycle time is shorter compared to forming a toothbrush in one injection step, due to shorter injection and cooling times.

According to another aspect a toothbrush is provided comprising a head comprising one or more cleaning elements, a handle and a neck portion being connected to the head using a coupling element which is manufactured by the method as described herein. Thereby one or more of the optional steps can be combined with the basis method.

In the following, a detailed description of several example embodiments will be given. It is noted that all features described in the present disclosure, whether they are disclosed in the previous description of more general embodiments or in the following description of example embodiments, even though they may be described in the context of a particular embodiment, are of course meant to be disclosed as individual features that can be combined with all other disclosed features as long as this would not contradict the gist and scope of the present disclosure. In particular, all features disclosed for either one of the toothbrushes or the method to produce such toothbrushes may also be applied to the other one, if applicable.

Figure 1:
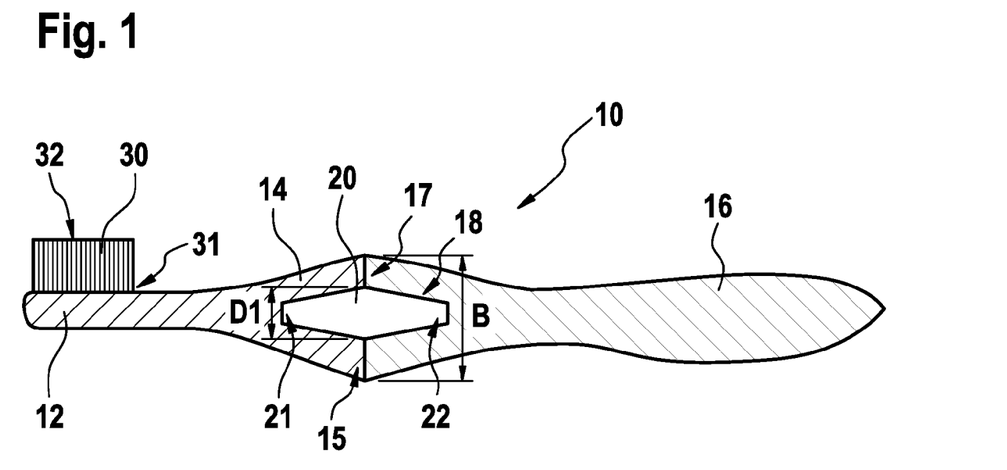
FIG. 1 shows a an example of a toothbrush 10 comprising a head 12, a handle 16 and a neck portion 14 being connected to the head 12 by a coupling element 20.

FIG. 1 shows an example of a toothbrush 10 comprising a head 12, a handle 16 and a neck portion 14 being connected to the head 12. The head 12 comprises one or more cleaning elements 30 having first ends 31 which are mounted to the head 12 and second ends 32 which protrude from the surface of the head 12. The second ends 32 are intended to clean the teeth during use of the toothbrush 10. The neck portion 14 comprises a coupling end 15 being connectable to the handle 16. The coupling end 15 of the neck portion 14 further comprises a coupling element 20 which protrudes from the coupling end 15 of the neck portion 14. The handle 16 comprises a receiving end 17 comprising a receiving element 18 suitable to receive the coupling element 20. By mounting the coupling element 20 connected to the neck portion 14 into the receiving element 18 of the handle 16 an irreversible connection is formed between the neck portion 14 and the handle 16 so that the toothbrush 10 cannot be separated again into several parts without destroying the neck portion 14, the handle 16 and/or the coupling element 20 irreversibly.

The coupling element 20 may be a conically shaped body comprising a first end 21 protruding into the neck portion 14 and a second end 22 protruding into the handle 16. The coupling element 20 comprises a diameter D1. The diameter D1 may be smaller to the diameter B of the toothbrush 10 at the connection between the neck portion 14 and the handle 16. In addition or alternatively, the diameter D1 of the coupling element 20 may be constant or it may decrease towards the ends 21, 22 of the coupling element 20.

Figure 2:
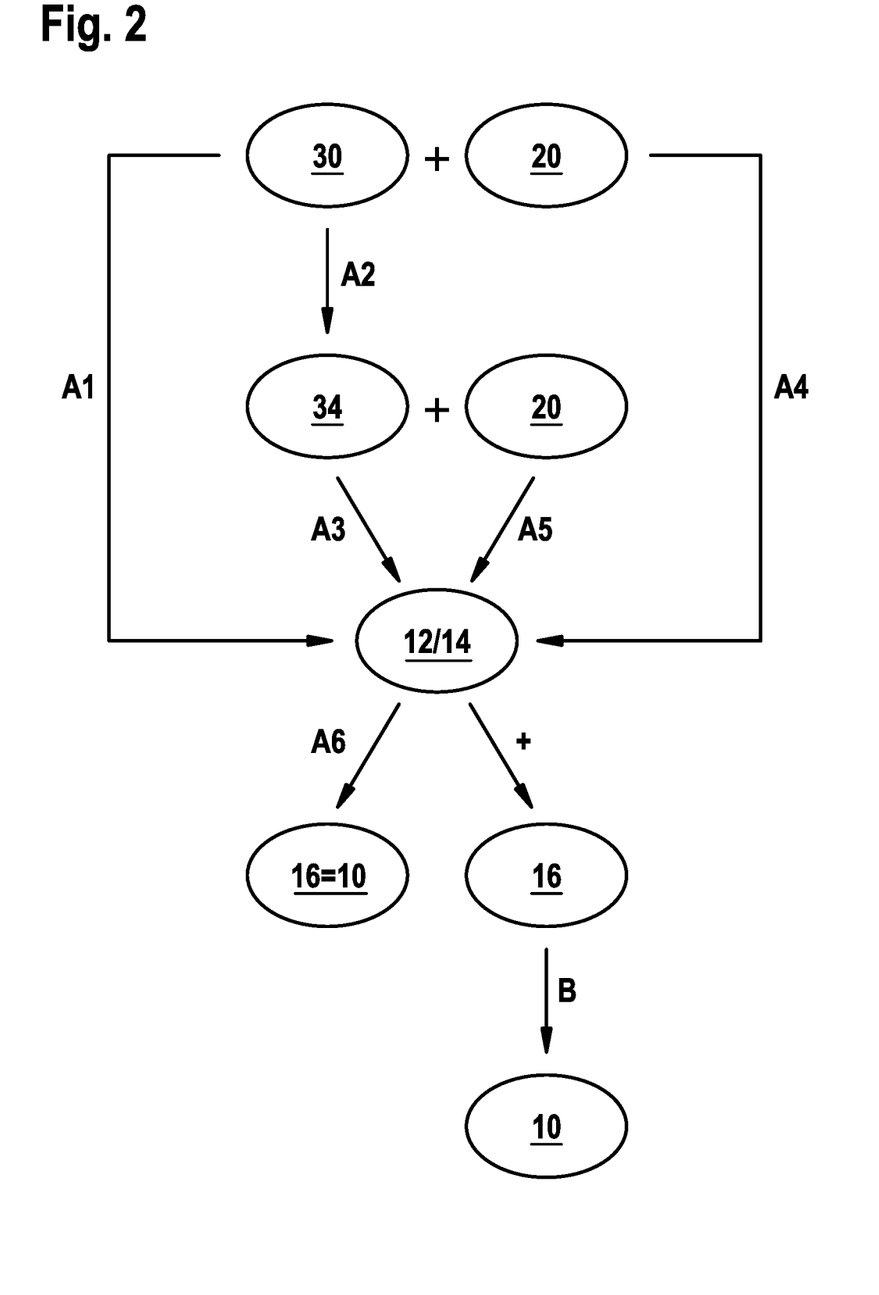
FIG. 2 shows schematically the process of toothbrush 10 manufacturing.

FIG. 2 shows schematically the manufacturing steps as disclosed herein to produce a toothbrush 10. Some of the steps may be performed in parallel or successively. In addition, alternative steps are shown. In a first step cleaning elements 30 are provided in a form which allows the attachment of the cleaning elements to a brush head 12. For example, the cleaning elements 30 are provided in a mold bar so that the ends to be attached to the head 12 can be over-molded in an injection molding step A1 forming the brush head 12 or the head 12 together with the neck portion 14. Alternatively, to the direct over-molding of the cleaning elements in step A1 two injection molding steps A2 and A3 may be used to form the head 12 or the head 12 together with the neck portion 14. A pre-molding step A2 may be performed, wherein a plate 34 may be produced which carries the cleaning elements 30. The plate 34 will form a part of the final head 12. After injecting the plate 34, the head 12 or the head 12 together with the neck portion 14 may be produced in another molding step A3 thereby over-molding the plate 34.

In parallel the coupling element 20 is provided from the corresponding material, e.g. plastic. The coupling element 20 can be arranged in a mold in which it can be over-molded in step A4, wherein the neck portion 14 or the neck portion 14 together with the head 12 are formed. The cleaning elements 30 or the plate 34 may be over-molded in parallel to the coupling element 20 in one common molding step so that the head 12 and the neck portion 14 are formed together providing both the cleaning elements 30 and the coupling element 20. That means injection step A1 and injection step A4 may be one injection step. Alternatively, injection steps A3 and A5 may be identical. If steps A1 and A4 or A3 and A5 are be performed as one common injection molding step, the cleaning elements 30 or the plate 34 carrying the cleaning elements 30 and the coupling element 20 are arranged in one common mold in which the head 12 and the neck portion 14 are formed.

In order to provide a complete toothbrush 10 the head 12 and neck portion 14 have to be combined with a handle 16. The handle 16 may be provided in a different step in parallel to the manufacturing of the head 12 and neck portion 14. The material from which the handle 16 is formed determines the "providing step". For example, if the handle 16 is formed from plastic material the handle 16 is provided by injection molding. Thereby the handle can be injected directly onto the coupling element 20 protruding from neck portion 14 in injection molding step A6. By directly mounting the handle 16 onto the coupling element 20 a very secure connection is formed. Alternatively, the handle 16 can be injected separately and is connected to the neck portion 14 in connection step B. Alternatively, the handle 16 may be also provided from another suitable material such as wood or steel and is connected to the neck portion 14 in connection step B. If, the handle 16 is provided in parallel to the head 12 and neck portion 14 the parts of the toothbrush 12/14 and 16 are combined irreversibly in step B via the coupling element 20. This connection B may be for example any snap and fit connection which cannot be separated, gluing, chemical bonding, such as melting etc. By the final combination of the handle 16 and the neck portion 14 the toothbrush 10 is provided.

Figure 3:
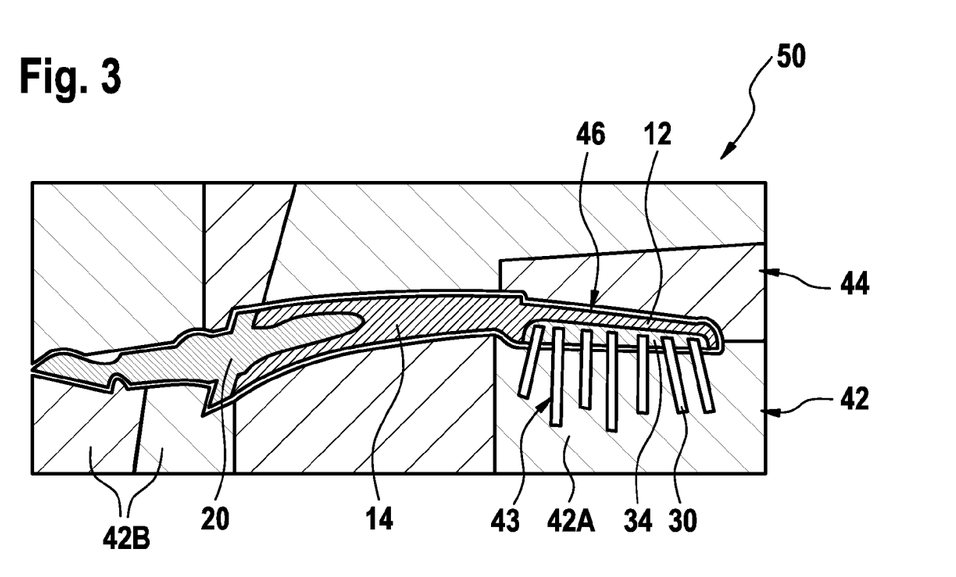
FIG. 3 shows the mold 50 prepared for injection molding of the head 12 and the neck portion 14 thereby over-molding the cleaning elements 30 and the coupling element 20.

FIG. 3 shows schematically in one picture selected parts of molds which can be used to produce a preferred arrangement of a mold 40 which can be used to mold the head 12 and the neck portion 14, wherein the neck portion 14 provides the coupling element 20. A lower half 42 of the mold 40 comprises a mold bar 42A which provides the cleaning elements 30 to the mold cavity 46.

Thereby, the cleaning elements 30 are located in blind holes 43 of mold bar 42A. The cleaning elements 30 may be over-molded by a small plate 34. The plate 34 shuts the blind holes 43 of the mold bar 42A against the injected material during the injection molding. A pin bar 42B of the lower half 42 of the mold 40 provides the coupling element 20 to the mold cavity 46 in such that a part of the coupling element 20 will be over-molded. The upper mold half 44 provides the second half of the mold cavity 46. The mold cavity 46 is identical to the head 12 and the neck portion 14. During injection molding the coupling element 20 and the cleaning elements 30 are over-molded and thereby included into the head 12 and the neck portion 14. The lower half 42 of the mold 40 and the upper half 44 of the mold 40 may comprise one or more partial mold halves A, B, if necessary to form the outer surface of the head 12 and the neck portion 14.

Figure 4A:
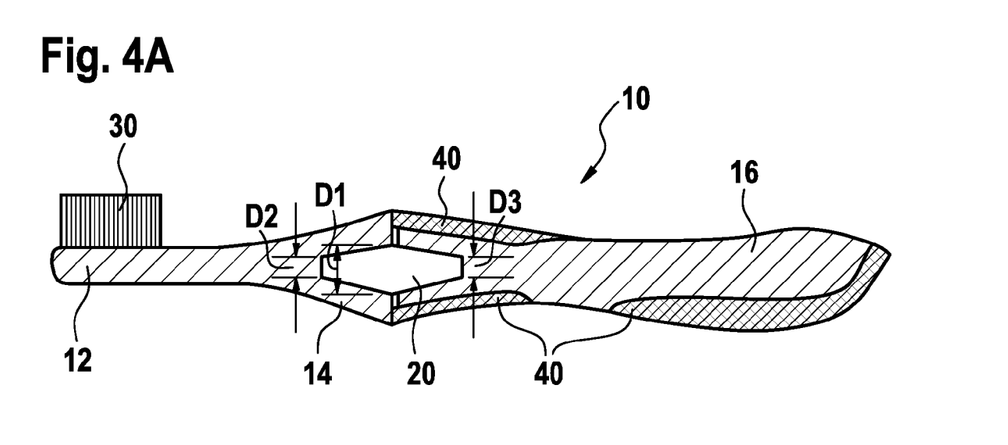
FIG. 4A shows a toothbrush 10 as shown in FIG. 1A, wherein the handle 16 comprises elastomeric elements 40 at the outline.

All features disclosed in FIG. 1, whether described individually or in combination are also applicable to the toothbrush 10 shown in FIG. 4A. Features that are in common with the toothbrush 10 shown in FIG. 1 are designated with the same reference numerals and are not described in detail again. The handle 16 shown in FIG. 4A comprises elastomeric elements 40 at the outline. These elastomeric elements 40 may be design elements in order to improve the optical appearance and/or may be functional elements improving for example the haptic of the handle. The functional elements may improve the overall haptic of the handle or may provide grapping areas for the fingers.

Figure 4B:
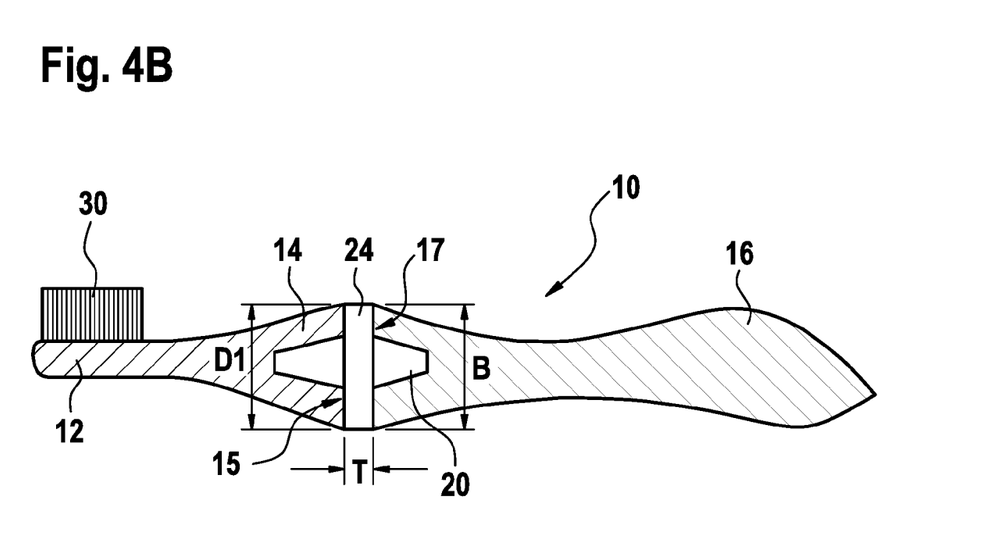
FIG. 4B shows another example of a toothbrush 10, wherein the coupling element 20 comprises a circumferential elevation 24 and wherein the diameter D1 of the circumferential elevation 24 is identical to the diameter B at the contact surface of the neck portion 14 and the handle 16.
Figure 4C:
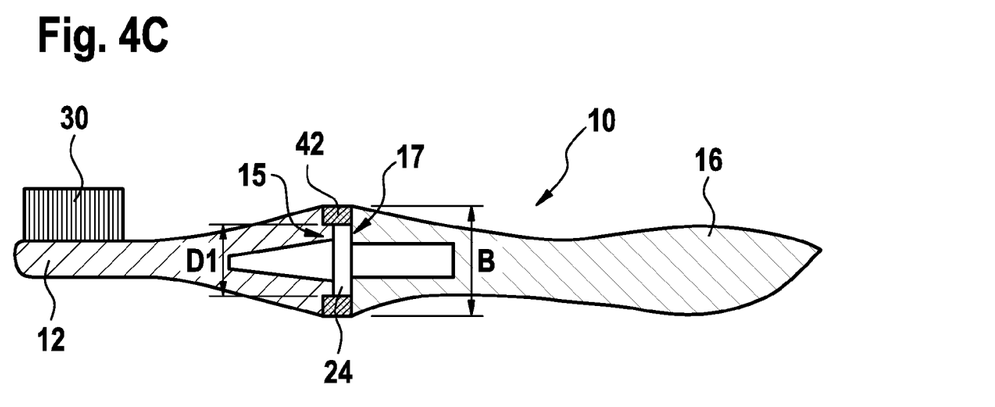
FIG. 4C shows another example of a toothbrush 10, wherein the coupling element 20 comprises a circumferential elevation 24 and wherein the diameter D1 of the circumferential elevation 24 is smaller than the diameter B at the contact surface of the neck portion 14 and the handle 16.

FIGS. 4B and 4C show other examples of a toothbrush 10, wherein the coupling element 20 comprises a circumferential elevation 24. All features disclosed in FIGS. 1 and 4A, whether described individually or in combination are also applicable to the toothbrush 10 shown in FIGS. 4B and 4C. Features that are in common with the toothbrush 10 shown in FIGS. 1 and 4A are designated with the same reference numerals and are not described in detail again. The circumferential elevation 24 represents the central portion of the coupling element 20. The diameter D1 of the circumferential elevation 24 may be identical to the diameter B of the coupling end 15 of the neck portion 14 and the receiving end 17 of the handle 16 (s. FIG. 4B). Thus, the circumferential elevation 24 is visible at the outline of the toothbrush 10 and may be used as a design element. The thickness T of the circumferential elevation may be for example 2 mm. The circumferential elevation is arranged perpendicular or in an angle to the longitudinal axis of the toothbrush.

Alternatively, the diameter D1 of the circumferential elevation 24 may smaller than the diameter B of the coupling end 15 of the neck portion 14 and the receiving end 17 of the handle 16 (s. FIG. 4C). Thus, the circumferential elevation 24 is invisibly hidden in the neck portion 14 and the handle 16. The coupling end 15 and the receiving end 17 may show a common contact surface (not shown) or a gap may be present between the ends 15, 17 which may be filled with a sealing material 42. Said sealing material 42 may be a hard plastic material, an elastomeric material, a resin or any other material suitable to seal.

Figure 5:
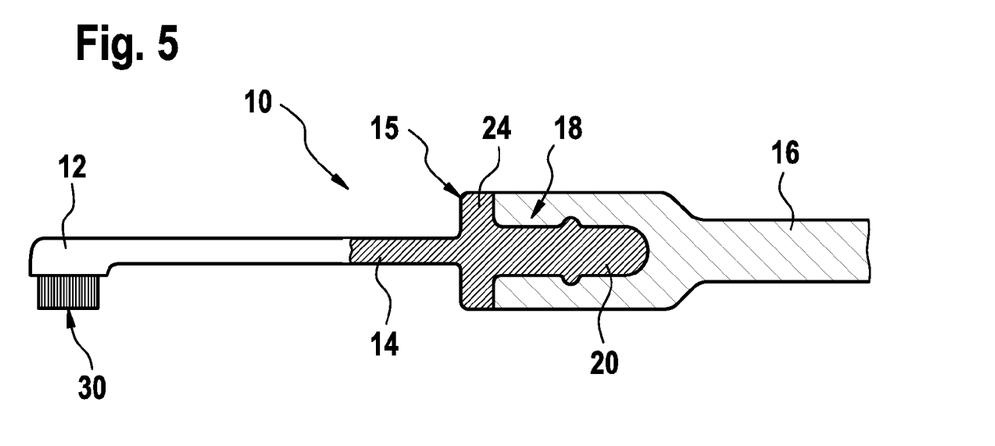
FIG. 5 shows another example of a toothbrush 10, wherein the coupling element 20 forms an inseparable part of the neck portion 14.

FIG. 5 shows another example of a toothbrush 10 comprising a coupling element 20. All features disclosed in FIG. 1 or 4, whether described individually or in combination are also applicable to the toothbrushes 10 shown in FIG. 5. Features that are in common with the toothbrush 10 shown in FIG. 1 or 4 are designated with the same reference numerals and are not described in detail again. FIG. 5 shows the central, namely the coupling part of a toothbrush 10, wherein the coupling element 20 forms an inseparable part of the neck portion 14. The coupling element 20 directly protrudes from the coupling end 15 of the neck portion 14 and cannot be distinguished from the neck portion 14. Thus, the circumferential elevation 24 represents also the coupling end 15 of the coupling element 20. The coupling element 20 comprises protrusions as security elements 26 in order to secure a safe and irreversible connection between the coupling element 20 and the receiving element 18 of the handle 16.

FIG. 6 show additional examples of a toothbrush 10 comprising a coupling element 20. All features disclosed in FIG. 1, 4 or 5, whether described individually or in combination are also applicable to the toothbrushes 10 shown in FIG. 6. Features that are in common with the toothbrush 10 shown in FIG. 1, 4 or 5 are designated with the same reference numerals and are not described in detail again.

Figure 6A:
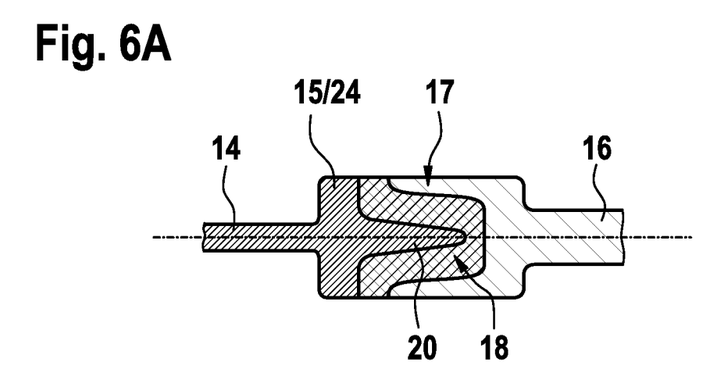
FIG. 6A shows another example of a toothbrush 10, wherein the coupling element 20 forms an inseparable part of the neck portion 14 and the receiving element 18 is formed of an elastomeric material.

FIG. 6A shows another toothbrush 10, wherein the coupling element 20 forms an inseparable part of the neck portion 14. The receiving element 18 of the handle 16 is formed of a soft plastic material, such as a thermoplastic material. The receiving element 18 shows the same geometric shape than the receiving end 17 of the handle, which is formed from a hard plastic material. Receiving element 18 and receiving end 17 both comprise a cavity into which the coupling element 20 can be mounted. For example, the handle 16 and the coupling element 20 may be formed from a hard plastic material, such as polypropylene. Thereby, the cavity formed in the handle 16 is bigger than the coupling element 20. By filing the gap between the coupling element 20 and the receiving end 17 of the handle 16 with for example a thermoplastic elastomer the receiving element 18 is formed thereby irreversible combining the neck portion 14 and the handle 16.

Figure 6B:
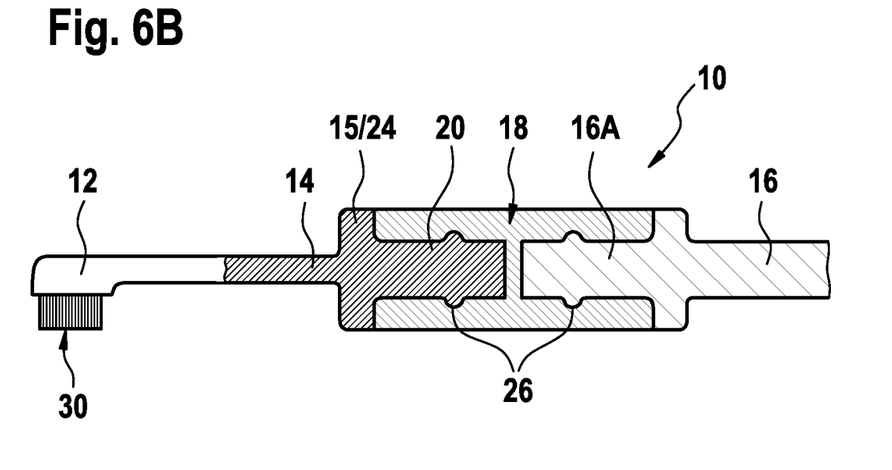
FIG. 6B shows another example of a toothbrush 10, wherein the coupling element 20 forms an inseparable part of the neck portion 14, wherein the receiving end 17 of the handle 16 is formed of two different materials.

FIG. 6B shows another toothbrush 10, wherein the coupling element 20 forms an inseparable part of the neck portion 14. The receiving end 17 of the handle 16 is formed of two different materials. A first material forms a protrusion 16A of the handle 16 comprising security elements 26. The second material surrounds the protrusion 16A and the coupling element 20 thereby forming the receiving element 18. The second material forming the receiving element 18 may be identical or different to the first material from which the handle 16 is formed. For example, the second material may be an elastomeric material. Thereby, the receiving element 18 of the handle represents both the receiving element 18 and a grapping surface onto which the fingers can be placed during use of the toothbrush 10.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of producing a manual toothbrush comprising a head having at least one cleaning element having a first end mounted to the head, a handle, and a neck portion connected to the head and to the handle, the method comprising:
   providing a coupling element comprising a first end structured and configured to be located in the neck portion and a second end structured and configured to be located in the handle, the first end being opposite to the second end, wherein providing a coupling element comprises making the coupling element by injection-molding;
   arranging the first end of the coupling element in a first injection molding cavity;
   providing the at least one cleaning element and arranging the first end thereof in the first injection molding cavity;
   injecting a first plastic material into the first injection molding cavity, wherein the first end of the at least one cleaning element and the first end of the coupling element are over-molded, thereby forming at least a portion of the head and the neck portion;
   providing a handle comprising a receiving element, wherein providing a handle comprises making the handle by injection-molding;
   irreversibly interconnecting the second end of the coupling element and the receiving element of the handle, thereby forming the manual toothbrush,
   wherein the injection molding of the coupling element and the injection molding of the handle is performed in parallel.

2. The method according to claim 1, wherein the second end of the coupling element is over-molded by the injection molding of the handle.

3. The method according to claim 1, wherein the second end of the coupling element and the receiving element of the handle are connected by an inseparable snap-and-fit connection.

4. The method according to claim 1, wherein the second end of the coupling element and the receiving element of the handle are adhesively combined.

5. The method according to claim 4, wherein the second end of the coupling element and the receiving element of the handle are combined using at least one material selected from the group consisting of adhesive materials and glues suitable for chemically bonding plastic parts together.

6. The method according to claim 1, wherein the second end of the coupling element and the receiving element of the handle are connected by melting at least one of a surface of the second end of the coupling element and a surface of the receiving element of the handle and chemically connecting said surfaces by pressing them together.

7. The method according to claim 1, wherein providing the at least one cleaning element comprises providing a plurality of the cleaning elements, arranging said cleaning elements in holes of a mold bar so that the first ends of the cleaning elements are arranged outside of the mold bar, and fusing at least some of said first ends together.

8. The method according to claim 7, wherein arranging the cleaning elements comprises injecting an elastomeric material in at least one of the holes of the mold bar so that elastomeric cleaning elements are formed.

9. The method according to claim 8, wherein the method comprises a pre-molding step, wherein the ends of the cleaning elements are over-molded with a second plastic material before the head is formed.

10. The method according to claim 9, wherein the first plastic material and the second plastic material are different from one another.

11. The method according to claim 10, wherein at least one of the holes of the mold bar is filled with the second plastic material forming the at least one cleaning element.

12. The method according to claim 9, wherein at least one of the holes of the mold bar is filled with the second plastic material forming the at least one cleaning element.

13. The method according to claim 7, wherein the method comprises a pre-molding step, wherein the first ends of the cleaning elements are over-molded with a second plastic material before the head is formed.

14. The method according to claim 13, wherein the first plastic material and the second plastic material are different from one another.

* * * * *